E. McCOY.
VALVE AND PLUG COCK.
APPLICATION FILED SEPT. 24, 1912.
1,101,868.
Patented June 30, 1914.
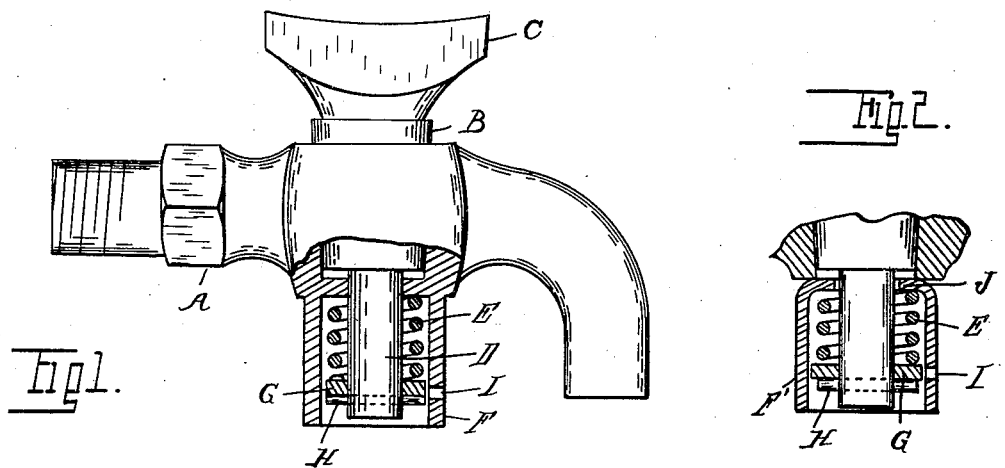
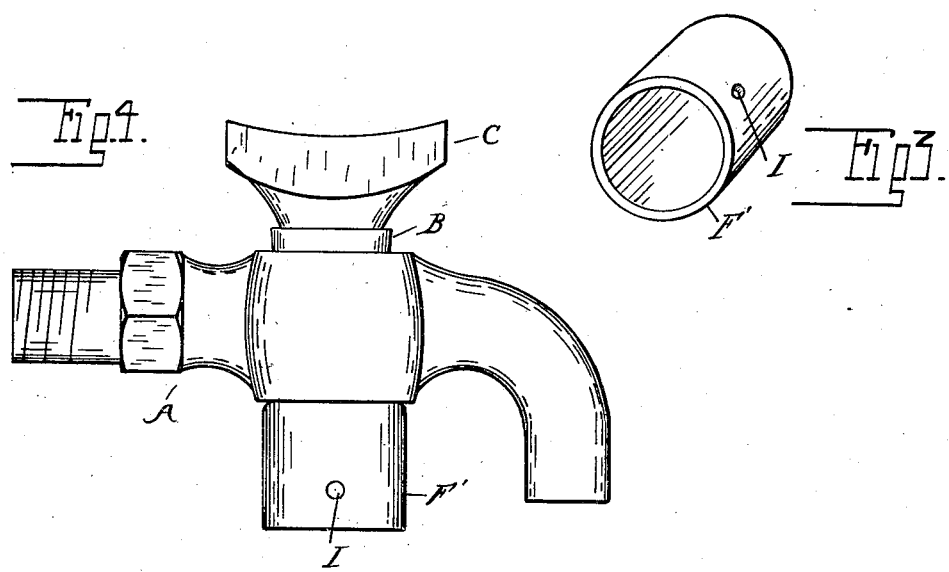
Witnesses
W. E. Ford
James P. Barry
Inventor
Elijah McCoy
By Whittemore Hulbert + Whittemore
Att'ys

UNITED STATES PATENT OFFICE.

ELIJAH McCOY, OF DETROIT, MICHIGAN, ASSIGNOR TO JOHN N. COURTNEY, OF DETROIT, MICHIGAN.

VALVE AND PLUG-COCK.

1,101,868.  Specification of Letters Patent.  Patented June 30, 1914.

Application filed September 24, 1912. Serial No. 722,136.

*To all whom it may concern:*

Be it known that I, ELIJAH McCOY, a citizen of the United States of America, residing at Detroit, in the county of Wayne and State of Michigan, have invented certain new and useful Improvements in Valves and Plug-Cocks, of which the following is a specification, reference being had therein to the accompanying drawings.

The invention relates to plug valves or cocks of that type in which the plug is of tapering form and is yieldably drawn to its seat by a spring so as to maintain a tight joint at all times. This spring is usually sleeved upon the shank of the plug and is held in position by a cotter pin and two washers, the latter being arranged at the opposite ends of the spring. With this construction dust and other dirt is liable to accumulate about the spring and to detract from the appearance of the valve as well as to interfere with its proper operation. Furthermore, if the cotter pin becomes detached there is nothing to prevent the spring and washers from dropping off.

It is the object of the present invention to obtain a simplified construction of valve in which the spring is housed and protected from dust and dirt and which absolutely prevents accidental disengagement of the parts. To this end the invention consists in the construction as hereinafter set forth.

In the drawings—Figure 1 is a vertical longitudinal section through one form of the cock; Fig. 2 is a similar view showing a modified construction; Fig. 3 is a perspective view of some of the parts of the construction shown in Fig. 2, detached. Fig. 4 is a side elevation of the valve.

A is the casing of the cock, B the taper plug having the usual handle C and shank D on which latter the spring E is sleeved.

In the construction shown in Fig. 1 the casing A has formed integral therewith, the downwardly extending tubular housing F which concentrically surrounds the shank D and is of sufficient diameter to receive the spring E. G is a washer forming an abutment for the lower end of the spring, and H is a cotter pin for holding the washer in position. To permit of engaging this pin, the tubular housing F is apertured at I but this aperture is so located that the pin when inserted therethrough can only be registered with the corresponding aperture in the shank by moving the latter upward against the tension of the spring E. Thus after the pin is inserted and the pressure on the spring is relieved, the plug with the washer and pin will be forced downward so that the latter is no longer in registration with the aperture I. Consequently there will be no possibility of its becoming detached as it is held from movement by the housing F in every position of adjustment.

In Figs. 2 and 3, a modified construction is shown in which the housing F' is formed of a separate tubular member having its inner end flanged inwardly at J to fit about the shank D and to form an abutment for the inner end of the spring. The other elements of the structure are similar to the construction shown in Fig. 1.

It will be observed that in the complete structure as shown in Fig. 4 the spring, washers and pin are all concealed and protected by the housing and the lines of the casing have a pleasing effect.

What I claim as my invention is:

1. In a valve, the combination with a casing, of a plug valve therein having a shank extension, a spring sleeved upon said shank, a housing surrounding said spring and shank having an aperture in the side thereof, a cotter pin insertible through said aperture into engagement with an aperture in said shank when said spring is under compression and said plug is forced from its seat, the normal position of said parts being such that said pin is out of registration with said departure.

2. In a valve the combination with a casing, of a plug valve therein having a shank, a spring sleeved upon said shank, a tubular housing surrounding said shank, said housing having an inturned flange forming an abutment for the inner end of said spring, a cotter-pin insertible through an aperture in said housing into engagement with said shank when said spring is under compression and the valve is forced from its seat, the normal position of parts being such that when the spring holds the valve to its seat the pin is out of registration with the aperture in all positions of adjustment of the valve.

In testimony whereof I affix my signature in presence of two witnesses.

ELIJAH McCOY.

Witnesses:
W. J. BELKNAP,
JAMES P. BARRY.

Copies of this patent may be obtained for five cents each, by addressing the "Commissioner of Patents, Washington, D. C."